(12) United States Patent
Johansson et al.

(10) Patent No.: US 7,006,486 B1
(45) Date of Patent: Feb. 28, 2006

(54) ARRANGEMENT AND A METHOD IN A SWITCHED TELECOMMUNICATION SYSTEM

(75) Inventors: Mathias Johansson, Stockholm (SE); Lars Adolfsson, Stockholm (SE); Per Bäckström, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/572,559

(22) Filed: May 16, 2000

(30) Foreign Application Priority Data

Jun. 23, 1999 (SE) .................................. 9902245

(51) Int. Cl.
*H04L 12/66* (2006.01)

(52) U.S. Cl. .................................................... 370/352

(58) Field of Classification Search ................ 370/259, 370/349, 351–356, 389, 392, 397, 399, 395.21, 370/409; 709/204, 207, 220–222, 229, 235, 709/238, 240, 250
See application file for complete search history.

(56) References Cited

U.S. PATENT DOCUMENTS

| | | | | |
|---|---|---|---|---|
| 5,572,528 | A | * | 11/1996 | Shuen ......................... 370/402 |
| 5,684,800 | A | | 11/1997 | Dobbins et al. |
| 5,751,967 | A | * | 5/1998 | Raab et al. .................. 709/228 |
| 5,812,533 | A | * | 9/1998 | Cox et al. .................... 370/259 |
| 6,032,272 | A | * | 2/2000 | Soirinsuo et al. ........... 714/706 |
| 6,085,238 | A | * | 7/2000 | Yuasa et al. ................. 370/409 |
| 6,141,339 | A | * | 10/2000 | Kaplan et al. ......... 370/395.61 |

(Continued)

FOREIGN PATENT DOCUMENTS

| | | |
|---|---|---|
| EP | 0 812 086 A2 * | 10/1997 |
| EP | 812 086 | 12/1997 |
| WO | 95/01023 | 1/1995 |
| WO | WO 95/01023 * | 1/1995 |
| WO | 98/44684 | 9/1999 |

OTHER PUBLICATIONS

Sridhar, Thayumanavan, "Layer 2 and Layer 3 Switch Evolution", Cisco Systems, The Internet Protocol Journal, Sep., 1998.*
Copy of International-Type Search Report.
Thayumanavan Sridhar, "Layer 2 and Layer 3 Switch Evolution", The Internet Protocol Journal, vol. 1, No. 2, Sep. 1998, Cisco.
Explanatory paragraphs of the above-referenced Sridhar document and EPO 812 086.

*Primary Examiner*—Chi Pham
*Assistant Examiner*—Anh-Vu Ly

(57) ABSTRACT

The present invention relates to a telecommunication system giving the option to a user (A1) to select desired services. A switched domain (5) for transmission of data packets has switches (SW1), to which service providers (1–4), and network terminals (NT1–NT7) are connected. The switches have a user port (Pf) through which one single physical connection is connected to an uplink port (Pe) in the network terminal (NT1). The user port (Pf) is configured for the different service providers (1–4) and the network terminals have corresponding service ports (Pc,Pd). The user (A1,8) or an operator (OP1) configures the service ports (Pc,Pd) which corresponds to the desired services (7,8). Using a policy server (PS1), which is connected to the network terminals (NT1) the traffic in these can be given priority. The data packets in the traffic which requires real time transmission, for example television (7), is given priority before data traffic on Intranet (8).

12 Claims, 7 Drawing Sheets

U.S. PATENT DOCUMENTS

| | | | |
|---|---|---|---|
| 6,188,691 B1 * | 2/2001 | Barkai et al. | 370/390 |
| 6,452,923 B1 * | 9/2002 | Gerszberg et al. | 370/352 |
| 6,577,642 B1 * | 6/2003 | Fijolek et al. | 370/465 |
| 6,584,096 B1 * | 6/2003 | Allan | 370/352 |
| 6,873,624 B1 * | 3/2005 | Johansson et al. | 370/465 |
| 2002/0097675 A1 * | 7/2002 | Fowler et al. | 370/230 |
| 2002/0118676 A1 * | 8/2002 | Tonnby et al. | 370/352 |

* cited by examiner

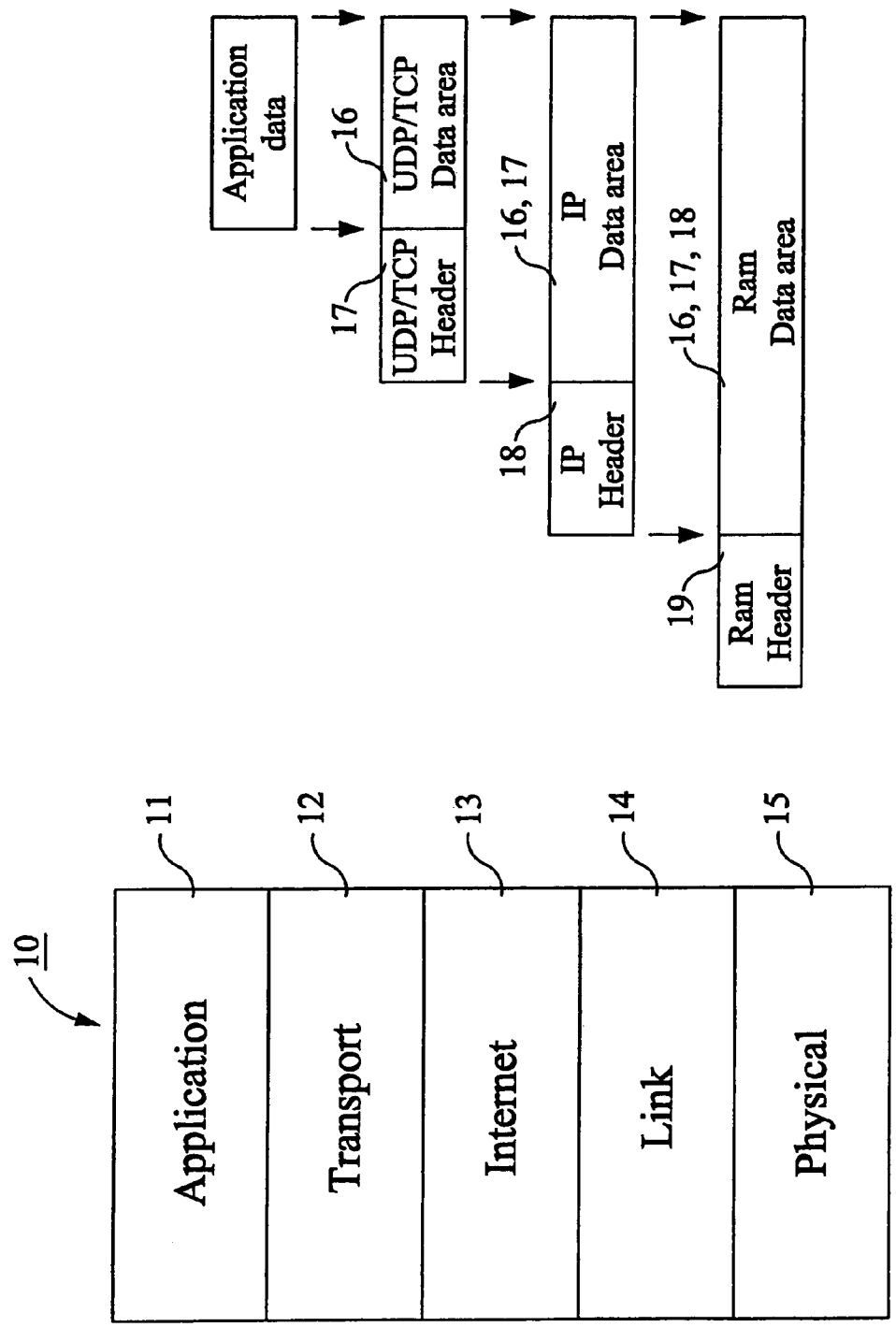

ARRANGEMENT AND A METHOD IN A SWITCHED TELECOMMUNICATION SYSTEM

This application claims priority under 35 U.S.C. §§119 and/or 365 to 9902245-1 filed in Sweden on Jun. 23, 1999; the entire content of which is hereby incorporated by reference.

TECHNICAL FIELD

The present invention relates to a device and a method in telecommunication having the option for an end user to select services. The invention also includes that transmitted information for a service is ensured a quality of the transmission corresponding to the service.

BACKGROUND ART

The rapid development in data and telecommunication creates a constant flow of new possibilities to serve a number of new needs and to meet new demands. The time when each network offered one single standard service is gone. It is now possible to offer a plurality of services having different characteristics in the same network in order to serve individual, specific needs. An individual household will be able to select their own set of services according to their own demands among a multitude of possibilities. Housing companies can rationalise administration and maintenance of their buildings and at the same time offer new types of services to their tenants. Other companies and also communities can benefit from the offered possibilities.

One of the techniques which then is used is virtual local networks, or techniques within the wider area virtual broad cast domains. The term virtual local networks is some time given the acronym VLAN (Virtual Local Area Network). The acronym itself VLAN is a market term which is used by almost every switch manufacturer, but it lacks a detailed definition. This results in that different manufacturers can use the same term without their equipment being compatible. A definition which is broad enough to cover different manufacturers equipment is as follows. VLAN: A logic level two (link level) broadcast domain. The selection from the total broadcast domain, i.e. all ports and MAC addresses (Medium Access Control), can be made in any of the following ways. a) Select the group of ports, b) Select a group of MAC addresses or c) Select a group of protocols, for example IP or IPX.

The standard IEEE 802.1Q, which has been adapted as industrial standard for VLAN, is based on standard LAN switches according to IEEE 802.2 standards. Switches which implement the standard IEEE 802.1Q are in principle switches compatible with the standard IEEE 802.1D (LAN switches), which have modifications for rules relating to incoming and transmitted data packets, an additional protocol for identifying VLAN capability of other switches and connected end systems and in addition having an VLAN transport mechanism based on implementation of VLAN marking of data packets via specific identification bits in the data packets.

The standard IEEE 802.1D describes how a so called LAN-switch should operate. A LAN-switch is to communicate user data in layer two in the OSI model, based on MAC addressing. Within this standard there are rules relating to transmission logic and how ports shall act in order to comply with for example requirements on transparent bridging, i.e. that the transmission logic remains invisible for apparatuses connected to the domain. Within the standard there are also topology rules in order to avoid loops.

In order to offer Ethernet traffic priority there is the standard IEEE 802.1p. This is an addition to the standard IEEE 802.1D. Ethernet communication is performed using data packets, to which a packet having an address is added. The communication is also divided into different levels, where each level has its own address packets.

The technique for virtual local networks is used to reduce costs associated with addition, moving or change of end user equipment within, for example, companies. The personnel within a part of the company, for example the purchasing department, shares the same resources in the network. By means of associating all users and resources to a VLAN it is possible to add new or remove old equipments, move personnel between floors and change their department belonging without moving cables or change access filters in IP-path selectors.

In the American Patent U.S. Pat. No. 5,751,967 a system for configuring virtual local networks is described. The system sets the switches of the network in a desired manner so that connected end stations are connected in a desired topology and the system can reconfigure the switches when the end stations move. The system has a central device for carrying out these tasks. This device comprises a circuit for sensing modifications of the topology. The central device also has a circuit containing rules how the switches are to be reconfigured when end stations are moved and a circuit for reading the rules and determining how end stations and switch ports are to be grouped. Finally, in the central device a circuit is incorporated which carries out the automatically decided reconfiguration. The system is efficient but has the drawback that it is completely automatically controlled by the central device and can not in any way easily be operated by the users.

The International Patent Application WO98/44684 describes a technique for creating virtual broadcast domains, which are virtual networks within a larger physical network. Also, a log in method is described according to which a terminal being switched on is associated with a first virtual broadcast domain. When the user later logs on he is switched to the virtual broadcast domain to which he belongs. A part of the stations in the larger network are connected to this virtual broadcast domain. A message from one of this stations only reaches the stations connected to the domain. The log in method has the advantage that it is possible to log on from an arbitrary terminal, but it also brings about administrative costs.

SUMMARY OF THE INVENTION

The present invention addresses the problem how an end user in a telecommunication system selects desired services from a number of offered services, which are delivered via a service network from service providers.

Another problem is to guarantee the services a transmission quality, which corresponds to the requirement for each respective service.

Another problem is related to secrecy, more particularly to how the selected services are to be kept secret for unauthorised service providers.

The problems are solved by means of giving the users a physical connection which can transmit all types of services. Each user also has a terminal of their own connected to the connection and the terminal has ports for offering the services. The user select services by means of activating the corresponding ports. In order to prevent overload of the connection the services are given a priority corresponding to the need they have for transmission in real time. Services requiring full real time access are given a priority to services which can be transmitted with interruption at a maintained quality.

In more detail, the problem is solved so that the service networks having the offered services are connected to a switched domain. The physical connection of the user connects this domain to the users own terminal and desired terminal ports are activated. User devices are connected to the activated ports. Information is transmitted in section signal sequences, data packets, to which each an address packet is attached. This address packet comprises information related to the priority given to the current data packet. The data packet can then be let through in the users terminal immediately or be delayed, all in relation to the requirements of the particular service in order for the user to perceive an adequate service. The switch domain, which is connected to several users, can have a corresponding priority of traffic but can as an alternative be dimensioned in order to let all traffic through immediately.

The service networks are separated from each other also at the virtual broadcast domains by means of excluding a certain type of switching elements, so called hubs, from the switched domain. There is full secrecy between the service providers, so that no providers can access traffic on another one of the service networks.

An object of the present invention is thus to offer access to services located on different networks to the users. The end user is able to freely choose service level and shall in a simple manner be able to change his level of service.

Another object is that the offered services shall have a high quality. This is to be obtained without heavily over-dimensioning the system.

A further object is that the different service providers are to be stopped from accessing information on each others networks.

An advantage of the invention is that the users in a simple manner can access a desired service from the service networks. A change of service level requires no extensive adjustments of servers in the networks.

Another advantage is that the network operator, often the owner of the local network, is relieved of having to keep track of service providers to which providers the users are connected. The network operator can if desired leave to the users to themselves change the ports on their own terminals when the users desire a changed service.

An advantage is also that traffic from the different service providers can be given priority, so that services requiring it can be transmitted in real time while other services can have a delayed transmission at a maintained quality.

Another advantage is that it is easy for the user to obtain a new service.

Yet another advantage is that unauthorised eavesdropping between service providers is made more difficult.

In the present description the term telecommunication system occurs, which includes a very broad technical field and comprises for example telephony, data, video and telemetric systems.

The invention will now be described in more detail using preferred embodiments and with reference to accompanying drawings.

DESCRIPTION OF THE FIGURES

FIG. 3 shows a block diagram of a communication structure having different layers;
FIG. 4 shows block diagrams of data sequences for the layers.

DESCRIPTION OF PREFERRED EMBODIMENTS

Figure 1:
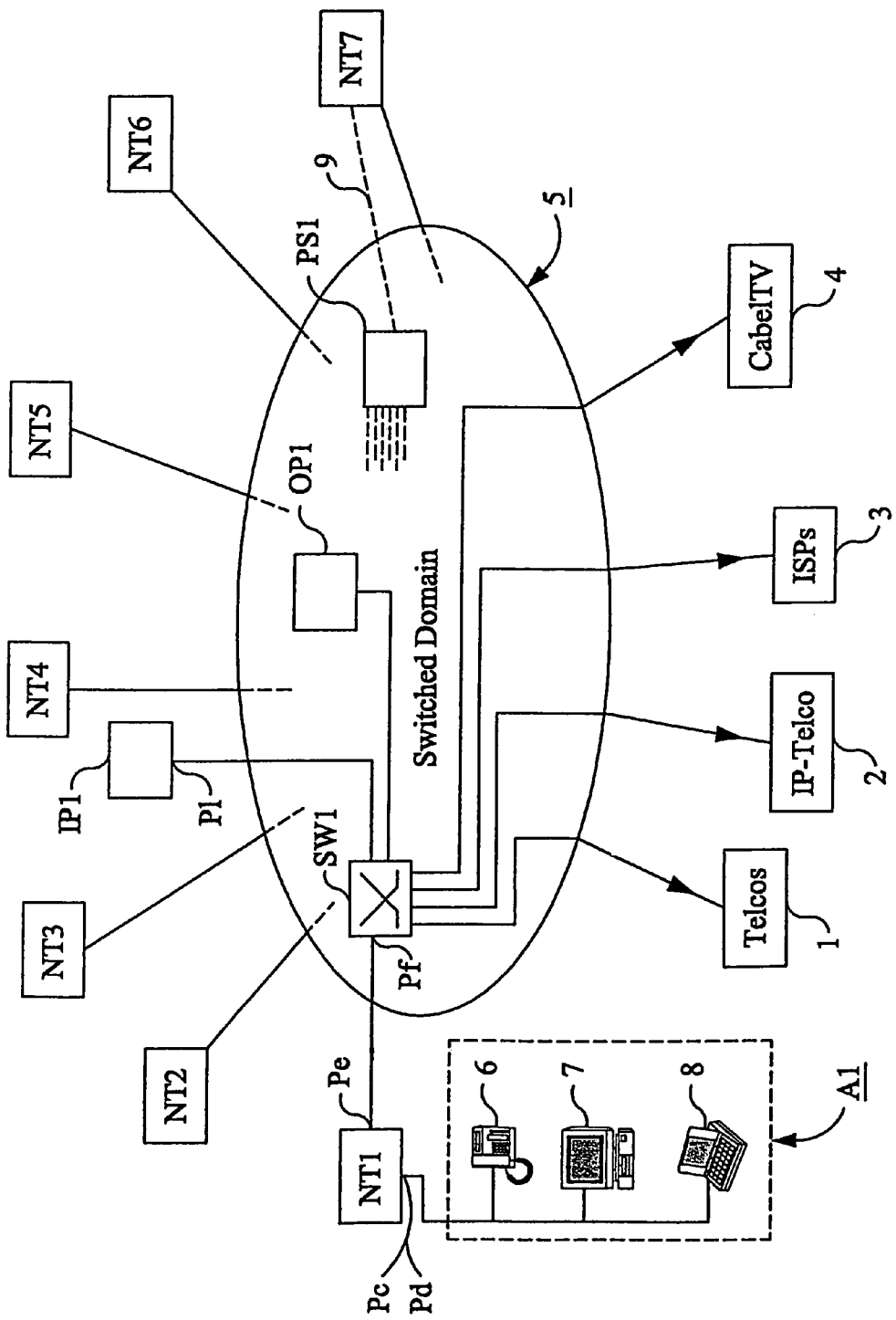
FIG. 1 shows a simplified block diagram of a network.

A fairly large number of different tele and data services are available at different service networks and different users have the possibility to select certain desired services and subscribe to these. The user can for example be a private person or belong to some type of group. In FIG. 1 it is very schematically shown how a large number of tele and data services are distributed from the service providers 1–4 (for example telephony, Internet and cable television), via a switched domain 5 to a user A1 at home or in a local company. The users have one network terminal NT1–NT7 each, which are described in more detail below. At the user A1 of the network terminal N1 some user apparatuses have been indicated, a telephone 6, a television 7, and a terminal 8 for Intranet. In the switched domain 5 a switch SW1 is shown with one user port Pf which is connected to an uplink port Pe in the network terminal NT1. In addition an IP-path selector IP1 and an operator OP1 of the switched domain are shown, both connected to the switch SW1. Also the other network terminals NT2–NT7 are connected to the switch SW1 or other switches not shown in the figure in the switched domain 5. For priority of traffic there is a policy server PS1 in the switched domain, which in the figure is shown connected to the network terminal NT7. The connection is shown by a dashed line in order to indicate that it is a logic connection, which is transmitted on the normal physical connections. This logic connection extends also to the other network terminals.

The switched domain 5 supports a general virtual broadcast domain (VBD), which for example can be a virtual local network (VLAN) over Ethernet. This offers opportunities to separate different telecommunication and data services.

Figure 2:
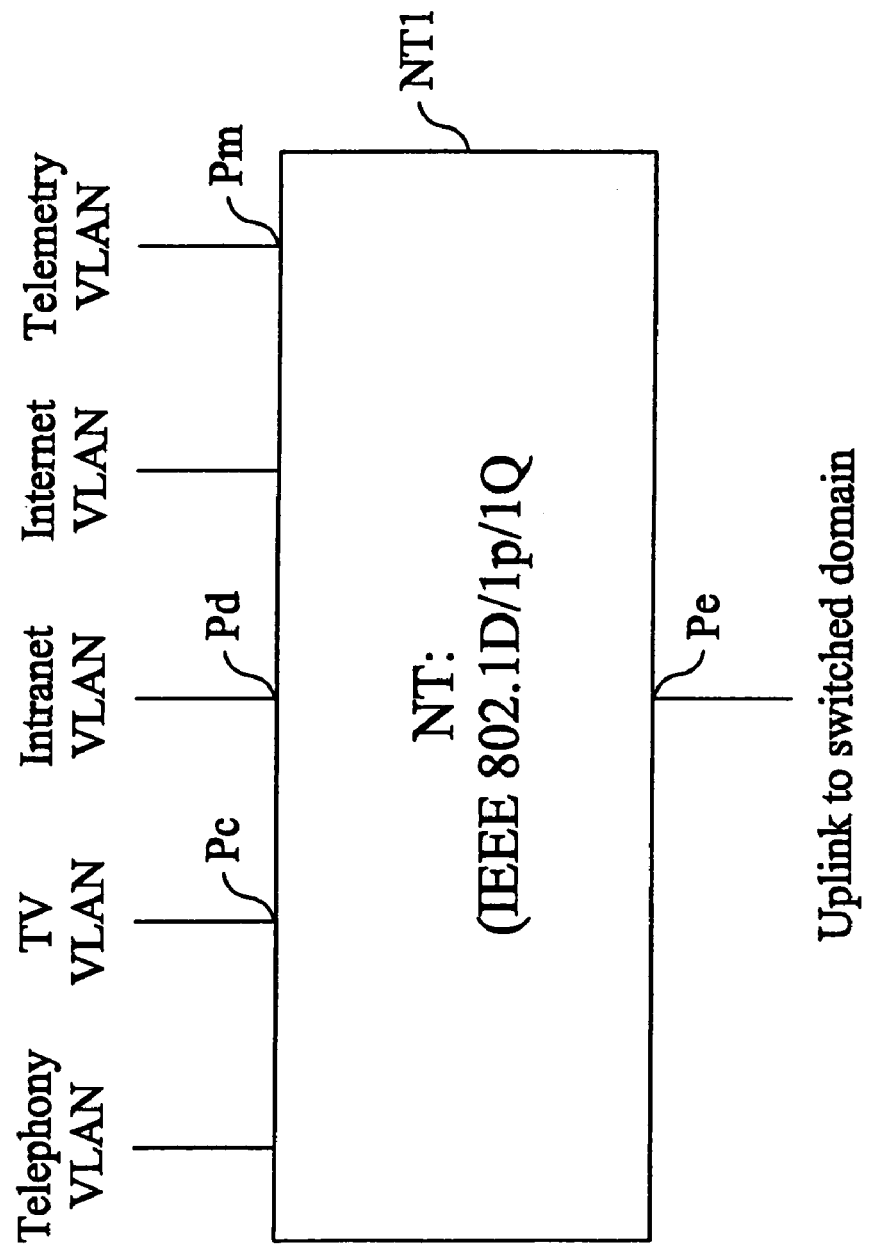
FIG. 2 shows a schematic view of a network terminal.

FIG. 2 shows the general function of the network terminals NT1–NT7. In the embodiment it is specified that the switched domain 5 operates according to the standards IEEE 802.1D, IEEE 802.1Q and IEEE 802.1p, which is a substandard to IEEE 802.1D. In principal it is not necessary that the switched domain 5 supports the standard 802.1p. In the present embodiment the network terminals shall support the standard IEEE 802.1D for transparent bridging, IEEE 802.1Q for virtual bridging of local networks (VLAN) and IEEE 802.1p for giving priority to traffic (Class of Service).

More specifically the uplink port Pe shall deliver all telecommunication and data services, transported over separate virtual local networks, in order to then let the network terminal distribute them to the service port Pc and Pd respectively on the network terminal to which the service belongs. Furthermore, the network terminal shall at the same time meet the priorities (vi IEEE 802.1p) which the operator has chosen. For example, telephony and television services, which are to be transmitted in real-time, shall have higher priority than a telemetry service.

Traffic which is generated from the user devices 6,7,8 via the service ports Pc, Pd of the network terminal shall in the same manner be distributed to the uplink port Pe having regard to the priorities which can be made. For example, the telephony service, which requires transmission in real-time, shall have priority before the Internet service.

Regardless the type of telecommunication, for example data or telephony, the communication is divided into a layered structure as is shown in FIG. 3. Each layer has its specific task towards overlying and underlying layers and together the layers form a stack. Within Internet technique the so-called TCP/IP stack 10 is used. This communication model, which is shown in the figure, consists of 5 layers 11–15:

Layer 11, Application: Is defined by a user process, which communicates with another process. This other process can for example be e-mail via the protocol SMTP or "surfing" via the protocol HTTP.

Layer 12, Transport: Is defined by that control of transmission of data between end stations can be added. Transmission control protocol (TCP) offers a secure transmission of data between the user processes, whereas user datagram protocol (UDP) does not offer a secure transmission. Furthermore, in this layer the term "port" is defined, which is not to be confused with the port belonging to a switch. The term "port" here has the task of making it possible to distinguish processes in the same machine which uses the same transport protocol.

Layer 13, Internet: Internet protocol (IP) defines this layer. It is on this level one can offer different path selections by so-called IP-path selectors (routers). The IP protocol, IP addressing and the IP path selector with its associated path selecting protocol provides the scalability present in today's Internet. The IP protocol does not offer a secure transmission. This is transferred to overlying protocols, which can be TCP, or if one uses UDP, application protocol.

Layer 14, Link: This layer defines the connection to the physical medium over which data is to be transmitted. The layer can, but does not have to, provide secure transmission. Furthermore the layer can be packet or stream oriented; IP does not put any requirements regarding this. Typical link techniques are Ethernet, ATM, Frame Relay etc.

Layer 15, Physical: This layer describes the physical media, which can be optical fibre, copper, the ether etc.

FIG. 4 shows the encapsulation method for data in the different layers. Application data 16 is delivered from the application layer 11 to the transport layer 12, adding a header 17 to data. The header 17 and data 16 is transmitted in a similar manner to the internet layer 13, again a header 18 is added. Finally data is transmitted to the link layer 14 and the same process, addition of a header 19 to data, is performed. In the link layer the application data 16 and header 17 and 18 are now regarded as data. Data is now completely encapsulated and can be transported between transmitter and receiver over the physical layer 15.

The completely encapsulated data 16, 17, 18, 19 reaches, via the physical layer 15, its final destination at the receiver. Here, the stack 10 is traversed upwards, and headers 19, 18 and 17 are in turn removed at the respective layer. The header 19, having the label Ram Header in the figure, comprises 12 bits, by means of which the data sequence in a known manner can be directed towards the desired virtual local network. In the other headers there is information regarding error control, multiplexing etc.

The standard 802,1Q enables the creation of virtual local networks (VLAN) over a link level based broadcast technique, for example Ethernet. There are two ways of implementing labelling of the packets at link level: implicit or explicit. Implicit labelling is performed in such a manner that the identification of a specific virtual local network is made a part of the destination address in the packet header 19. Explicit labelling is performed so that an additional field is added in the packets 16, 17, 18 having an label Ram Data area. Implicit labelling has the drawback that it is more complex. Explicit labelling has the drawback that it add to the length of the packet.

Figure 5:
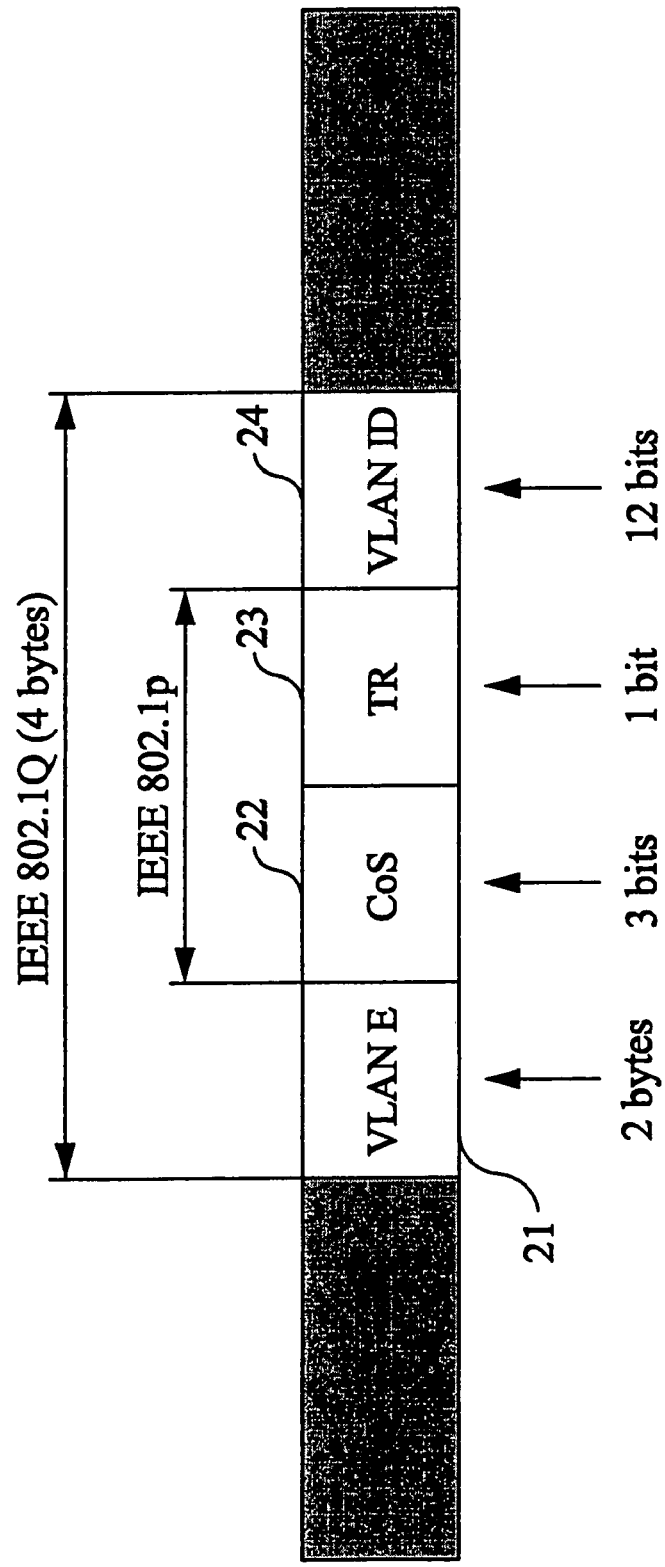
FIG. 5 shows a block diagram of a data sequence with explicit labeling of the bytes.

The standard 802.1Q referred to above uses explicit labelling of 4 bytes, as is shown in FIG. 5. A first part of 2 bytes 21 (VLAN E) is used to identify that the packet is labelled. For Ethernet, version 2, the hexadecimal representation of 8100 is for example used, which indicates that it is a packets having a labelling according to the standard 802,1Q. The remaining 2 bytes are divided into 3 parts. The first part is a Class of Service (CoS) field 22 comprising 3 bits, which is used for priority. Then follows one bit 23 (TR) which indicates the address format, i.e. if the principle "least significant bit first", or "most significant bit first", is to be used in conversions of link technique. The principle "least significant bit first" is used in Ethernet and "most significant bit first" is used for Token Ring or FDDI. The last 12 bits, a field 24, indicates which virtual local network (VLAN) the packet belongs to.

Figure 6:
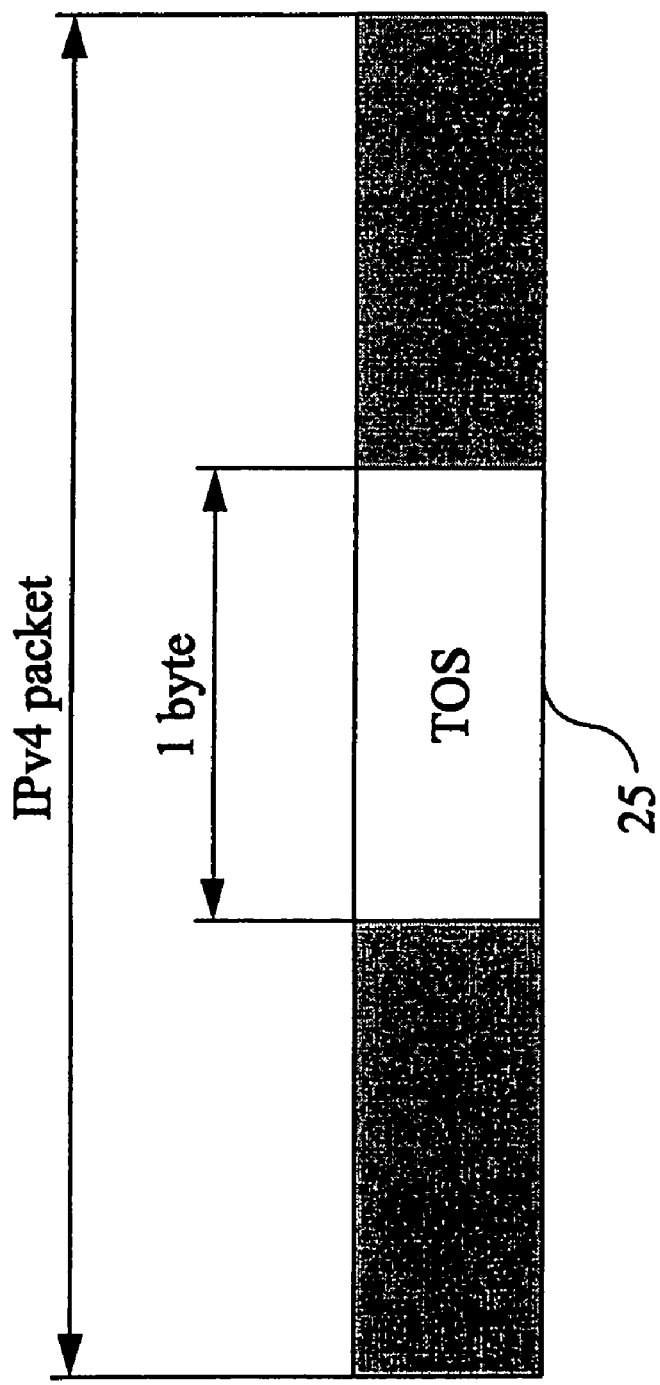
FIG. 6 shows a block diagram with one data sequence.

Also the Internet level 13 has the possibility to offer priority. This is performed via Internet Protocol version 4 (IPv4) and is described in more detail in FIG. 6. A field 25, comprising one byte and called "Type of Service" (TOS), offers a possibility of special priority of packet, in a similar manner as the field 22 (CoS) in the link packet in FIG. 5.

Figure 7:
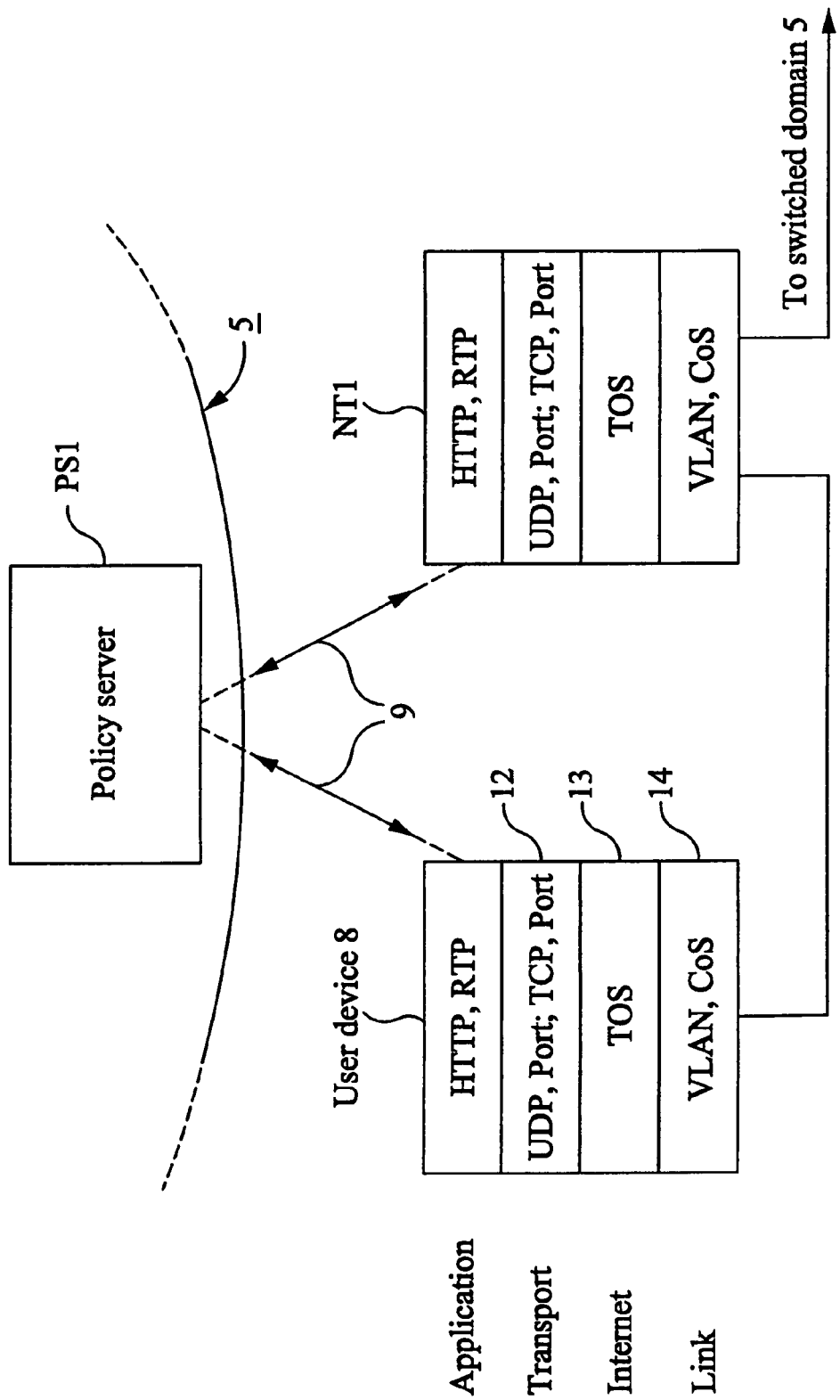
FIG. 7 shows a block diagram of priority of traffic.

Priority of traffic is formed in the network terminals NT1–NT7 at link level, layer 14, via inspection of the Class of Service field (CoS) 22 in FIG. 5. The CoS field comprises 3 bits and thus offers 8 possible levels of priority. An important item is at which level in the TCP-IP stack 10 one distinguishes traffic in order to then execute it using the CoS field. In FIG. 7 the relation between one of the user devices, the terminal 8, and the associated network terminal NT1 in the case that the priority is to be determined is shown. The policy server PS1 is shown in the switched domain 5 having its logical connections 9 to the network terminal NT1 and the user device 8. In the embodiment the network terminal is described as belonging to, except the link level (layer 14), also the Internet level (layer 13) and the transport level (layer 12). The description starts from the bottom of the stack 10.

Two cases occur when making priority. In the first case the link board in the user device support the standards IEEE 802.1Q and IEEE 802.1p. In the second case the link board does not support any of these standards.

In the first case, priority at link level, the facts are as follows: Suppose that the port Pd for the intranet in the network terminal NT1, to which the user device 8 is connected, belongs to a virtual local network (VLAN). If the link board in the user device supports the standards 802.1Q and 802.1p, this board can directly label the CoS bits 22 in the packets which is to be transmitted from the user device via the switched domain 5 to a receiver. The network terminal performs the prioritisation being used between the different virtual local networks. If the link board does not support the standards IEEE 802.1Q and IEEE 802.1p the network terminal has to label data packets from the user device using the correct VLAN identity and CoS bits according to FIG. 5. In neither of the cases the network terminal NT1 needs the Internet level or transport level in the TCP/IP stack 10.

Priority via the CoS field 22 offers as mentioned above 8 possible classes. If there now exists more than 8 virtual local networks to give priority to, a number of virtual local networks can, according to one alternative, be given the same class. According to another alternative one can, without any support in any IEEE standard, give priority based on virtual local networks, which theoretically offers $4096=2^{12}$ different classes, where the index 12 is the 12 bits in the field 24 in FIG. 5.

Giving priority at Internet level, layer 13: The TOS field in FIG. 6 offers a possibility to give priority to traffic. This priority is mapped into the CoS field. Another possibility is to only use the 3 bits in the TOS field and in this manner obtain a one-to-one mapping between the ToS and CoS fields.

For the second case, giving priority at transport level, is as follows. The parameters present to vary at the transport level, layer 12, is protocol (TCP or UDP) and port number (0-65535). Variations of protocol and port number can then be mapped into the field 25 TOS or the field 22 CoS. TCP and port 80 is associated with $A^{surfing} \cong$ on Internet and can thus be given a special priority in relation to all other traffic.

There is also a possibility to give this priority within the network terminals. This, however, requires that these terminals support the Internet level (layer 13) and the transport level (layer 12).

Giving priority at application level (layer 11) is as follows. At application level one can distinguish different types of applications. For example, HTTP is used for surfing and RTP is used for real time applications. From the different application protocols different priority rules are formed, which finally are implemented in the CoS labelling at link level.

If the application level priority according to above paragraph is to be performed inside the network terminal NT1, it is required that also the application level is supported in the network terminal.

Rules for giving priority can be formed and obeyed at different locations in the telecommunication system. Firstly, the user device, according to the example the terminal 8, can be offered the possibility to itself implement the CoS labelling. Secondly, the network terminal can be offered to determine the CoS labelling. Thirdly, the so called policy server PS1 can be used for giving priorities. For example, a log in sequence in the policy server can identify the user, which then is given a certain class of priority, which in turn is implemented in the network terminal and the switched domain.

The execution of the priority at link level, layer 14 in FIG. 3, can be performed in different ways. Traditional queuing is based on a queue having one buffer per port. This does not work for traffic having priority. Instead, a queue having one associating buffer per priority traffic class and per port is used. Additional complexity can be added in order to achieve the required quality for example for traffic flows in real time. An example of such a complex queue processing is the Weighted Fair Queuing algorithm.

Data packets which are generated by the user device 8 in FIG. 7 can, according to the discussion above, be labelled for priority either in the user device or in the network terminal NT1. This labelling is then used for giving priority to the traffic so that user applications is given the required quality. The network NT1 can now leave Ethernet packets to the switched domain SW1 either with or without labelling. If the network terminal transmits data packets without labelling the switched domain can not use the priority but has to operate according to the principle of offering large enough recourses, for example band width, in order for the user applications to receive the required quality.

Data packets, which according to FIG. 7, is to be transported from the switch domain, via the network terminal NT1, to one of the user devices 6, 7 or 8, can be labelled according to the standard IEEE 802.1p. In that case the network terminal can support priority according to this standard. In the case when a data packet is not labelled, no priority according to the standard IEEE 802.1p can be supported. However, priority according to the standard IEEE 802.1Q can be utilised, i.e., that a certain virtual local network (VLAN), for example for telephony, takes precedence for transport through the network terminal NT1 before another virtual local network, for example Intranet.

Figure 8:
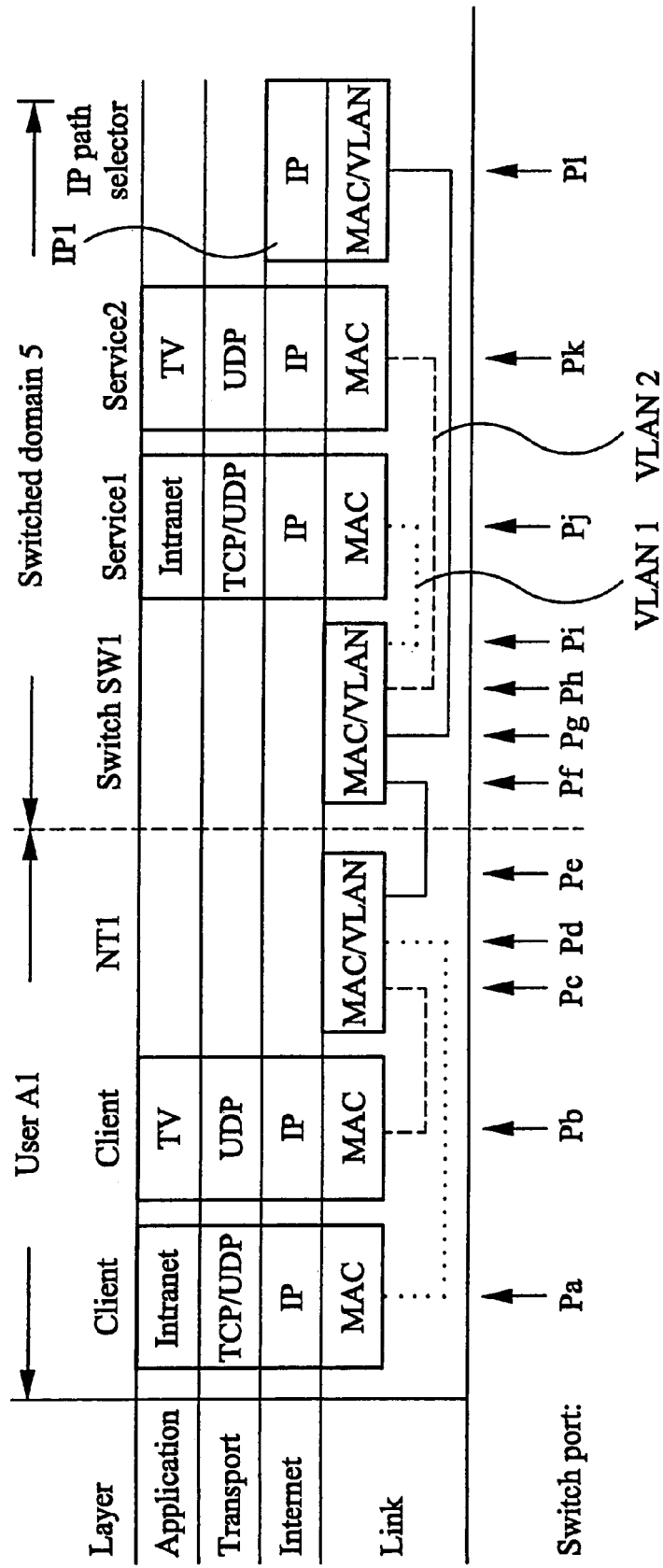
FIG. 8 shows a diagram of the layered communication structure over different devices in the network with their connections.

FIG. 8 illustrates the system in more detail. The figure is based on the layer communication model in FIG. 3 and shows schematically how the application layer 11, the transport layer 12, the Internet layer 13 and link layer 14 are common for the different parts in the communication system according to FIG. 1. In the figure the switch ports Pa, Pb, . . . Pl are shown, via which the parts are connected. Further, the figure is divided into the switched domain 5 to the right of the dashed vertical line and to the left of this line the user A1, which can be a home or a local company.

The switched domain comprises at least one switch, the switch SW1, which supports the standards IEEE 802.1D and IEEE 802.1Q. Furthermore, it can support IEEE 802.1p, but this is not required. To the switched domain there are services connected, according to the exemplary embodiment Intranet and television and the IP path selector IP1. This can have two functions. Firstly, services connected to the switched domain via the IP path selector, for example Internet and, secondly, it offers the possibility to offer communication between the separate service networks.

The network terminal NT1, which is to support the standards IEEE 802.1D, IEEE 802.1Q and IEEE 802.1p, and a number of user devices 6, 7 and 8 are located in the home/the local company. The television set 7 accesses the television service and the computer terminal 8 accesses the Intranet, as is described in conjunction with FIG. 1.

Two service networks are formed, Intranet and television, which are carried by virtual local networks, VLAN. The ports Pd and Pj belongs to the service network VLAN1 illustrated with dotted lines, which carries the Intranet service. The ports Pc and Pk belong to the service network VLAN2, illustrated with dashed lines, which carries the television service. The connection illustrated with continuous lines carries traffic from all service networks. If one of the ports Pa, Pb, Pj or Pk supports the standard IEEE 802.1Q this can also distinguish between the different service networks. This is however no requirement for the system to operate correctly.

In FIG. 2, a potential set of service ports for user devices was illustrated. A specific port, for example a port Pm for telemetry, can be implemented so that it does not use a link technique based on Medium Access Control, MAC, but some other technique for example RS232. In this case the port is to be associated with the MAC address which the network terminal NT1 has itself.

Assume that the user A1 is connected to the Intranet service and wishes to connect to the television service. The user contacts the operator OP1 of the switched domain 5. This can be carried out by means of a telephone call, an application present in the Intranet service or in another way. The operator configures the port Pc so that it belongs to a service network (VLAN) for television. The user device 7 for television then receives necessary parameters, either dynamically or statically, in order to be reached via the Internet level 13. In the same way, the service can be disconnected by means of the operator reconfiguring the port Pc so that it no longer belongs to the service network for television.

Also, an opportunity to give priority to traffic within a service network is offered. Assume that the user is connected to the Intranet service network. Among the services in the Intranet service there is a possibility to obtain information via a common web interface, for example information from the operator. Furthermore, the service to listen to and watch a playback of for example a local meeting in a housing area can be offered. The web application uses HTTP and the playback service uses Real Time Protocol (RTP). According to FIG. 7 a possibility to give priority to RTP traffic before HTTP traffic can than be offered.

There is also a possibility to combine one or several service networks. Assume that the different channels available via the television service network are stored on a server on the Intranet service network. In this way it is possible that the user uses his device for the Intranet service to select and configure his user device for the television network service.

In a typical scenario a large number of network terminals will be connected to the switched domain, significantly more than the seven network terminals NT1–NT7 which are shown in FIG. 1. This puts special requirements on configuration and supervision of the network terminals.

The link level 14 is not sufficient to efficiently administrate such a large number of network terminals. In such a case one solution is to let the network terminals be available on Internet, transport and application levels. It is then possible to create one or several virtual local networks (VLAN) where all or at least one part of all network terminals is a part. Hereby, configuration and supervision can be carried out efficiently, for example via IP multicast technique. Supervision and configuration can take place via Simple Network Management Protocol (SNMP) and Trivial File Transfer Protocol (TFTP) and utilise for example HTTP and thus a web interface as application for this.

What is claimed is:

1. A telecommunication system for enabling an end user to select communication services from a plurality of communication services, said system comprising:
   a telecommunication switch in a circuit-switched portion of the system;
   a plurality of service networks that communicate with the switch through Virtual Local Area Network (VLAN) connections at a link layer, each service network providing a different communication service, wherein at least one of the service networks provides intranet communications and at least one of the service networks provides television communications, and different channels of the television service network are stored on a server in the intranet service network; and
   a local network terminal that communicates with the switch through a VLAN connection configured to carry communications for the plurality of different services provided by the service networks, said network terminal including:
     a plurality of service ports for connecting a plurality of user devices to the network terminal, each of the user devices being configured to support a corresponding communication service;
     means for configuring the plurality of service ports for the respective user devices; and
     means for providing communications for the corresponding communication service to an activating user device in response to an activation of a service port by the activating user device;
   wherein a user device for the intranet service is utilized to select and configure a user device for the television service.

2. The telecommunication system of claim 1, wherein a plurality of local network terminals communicate with the switch through connections at the link layer configured to carry communications for the plurality of different services, and the telecommunication switch includes means for prioritizing communications from particular service networks.

3. The telecommunication system of claim 2, wherein the means for prioritizing communications includes means for delaying communications from service networks that are not delay-sensitive, and immediately passing through communications from service networks that are delay-sensitive.

4. The telecommunication system of claim 1, wherein the telecommunication switch immediately passes through communications from all of the service networks to the local network terminal, and the network terminal includes means for prioritizing communications from particular service networks.

5. The telecommunication system of claim 4, wherein the means within the network terminal for prioritizing communications from particular service networks includes means for determining a priority for each communication from a Class of Service field.

6. The telecommunication system of claim 4, wherein the local network terminal is configured to support communications at an application level, and the means within the network terminal for prioritizing communications from particular service networks includes means for distinguishing between different application types and determining a priority for each application type.

7. The telecommunication system of claim 1, further comprising a service port that connects a user device to the network terminal using an RS-232 port, said RS-232 port being associated with a Medium Access Control (MAC) address of the local network terminal.

8. A method of enabling an end user to select communication services from a plurality of communication services, said method comprising the steps of:
   connecting through Virtual Local Area Network (VLAN) connections at a link layer, a plurality of service networks that communicate with a telecommunication switch in a circuit-switched network, each service network providing a different communication service, wherein at least one of the service networks provides television communications, and at least one of the service networks provides intranet communications;
   storing different channels of the television service network on a server in the intranet service network;
   connecting a local network terminal to the telecommunication switch through a VLAN connection configured to carry communications for the plurality of different services provided by the service networks;
   connecting a plurality of user devices to the network terminal through a plurality of service ports, each of the user devices being configured to support a corresponding communication service;
   configuring the plurality of service ports for the respective user devices; and
   providing communications for the corresponding communication service to an activating user device in response to an activation of a service port by the activating user device, wherein a user device for the intranet service is utilized to select and configure a user device for the television service.

9. The method of claim 8, wherein a plurality of local network terminals communicate with the switch through connections at the link layer configured to carry communications for the plurality of different services, and the method further comprises prioritizing within the telecommunication switch, communications from particular service networks.

10. The method of claim 8, further comprising prioritizing within the local network terminal, communications from particular service networks.

11. The method of claim 10, wherein the step of prioritizing communications within the local network terminal includes the steps of:
configuring the local network terminal to support communications at an application level; and
prioritizing communications within the network terminal by distinguishing between different application types and determining a priority for each application type.

12. The method of claim 8, further comprising connecting a user device to the network terminal using an RS-232 service port, said RS-232 port being associated with a Medium Access Control (MAC) address of the local network terminal.

* * * * *